United States Patent [19]
Etter

[11] 3,779,533
[45] Dec. 18, 1973

[54] MACHINE MOUNTED CUTTING TORCH

[76] Inventor: Berwyn E. Etter, 10355 Paradise Blvd., Treasure Island, Fla.

[22] Filed: June 15, 1972

[21] Appl. No.: 263,269

[52] U.S. Cl............................ 266/23 T, 266/23 R
[51] Int. Cl.............................................. B23k 7/10
[58] Field of Search............... 266/23 R, 23 P, 23 T, 266/23 F; 239/391–395

[56] References Cited
UNITED STATES PATENTS

| 1,872,408 | 8/1932 | Coberly | 266/23 T |
| 2,519,871 | 8/1950 | Begerow | 266/23 F |
| 151,823 | 6/1874 | Baldwin | 239/392 |
| 1,639,328 | 8/1927 | Coberly | 239/394 |
| 2,697,485 | 12/1954 | McNally | 239/394 |
| 3,094,283 | 6/1963 | Balister | 239/393 |

FOREIGN PATENTS OR APPLICATIONS

| 183,563 | 7/1922 | Great Britain | 239/393 |
| 128,693 | 6/1950 | Sweden | 239/394 |
| 524,592 | 9/1921 | France | 239/394 |
| 817,232 | 8/1937 | France | 239/393 |

*Primary Examiner*—Gerald A. Dost
*Attorney*—Zarley, McKee et al.

[57] ABSTRACT

A machine mounted cutting torch is disclosed comprising a support means having a horizontal end portion positioned above the material being cut. A cutting tip support turret is selectively rotatably mounted on the end portion of the support means and has a plurality of spaced apart cutting tips secured thereto extending radially outwardly therefrom. A spring detent means is provided to yieldably maintain the turret in various positions with respect to the material being cut so that the selected cutting tip will be yieldably maintained in an operative position. A conduit means extends through the support means and the turret so that oxygen and industrial gas are supplied only to the cutting tip which is in the operative position. Means are provided to prevent the escape of gas from the turret. Control means is provided for supplying the desired oxygen and gas volumes and ratios to the cutting tip.

5 Claims, 4 Drawing Figures

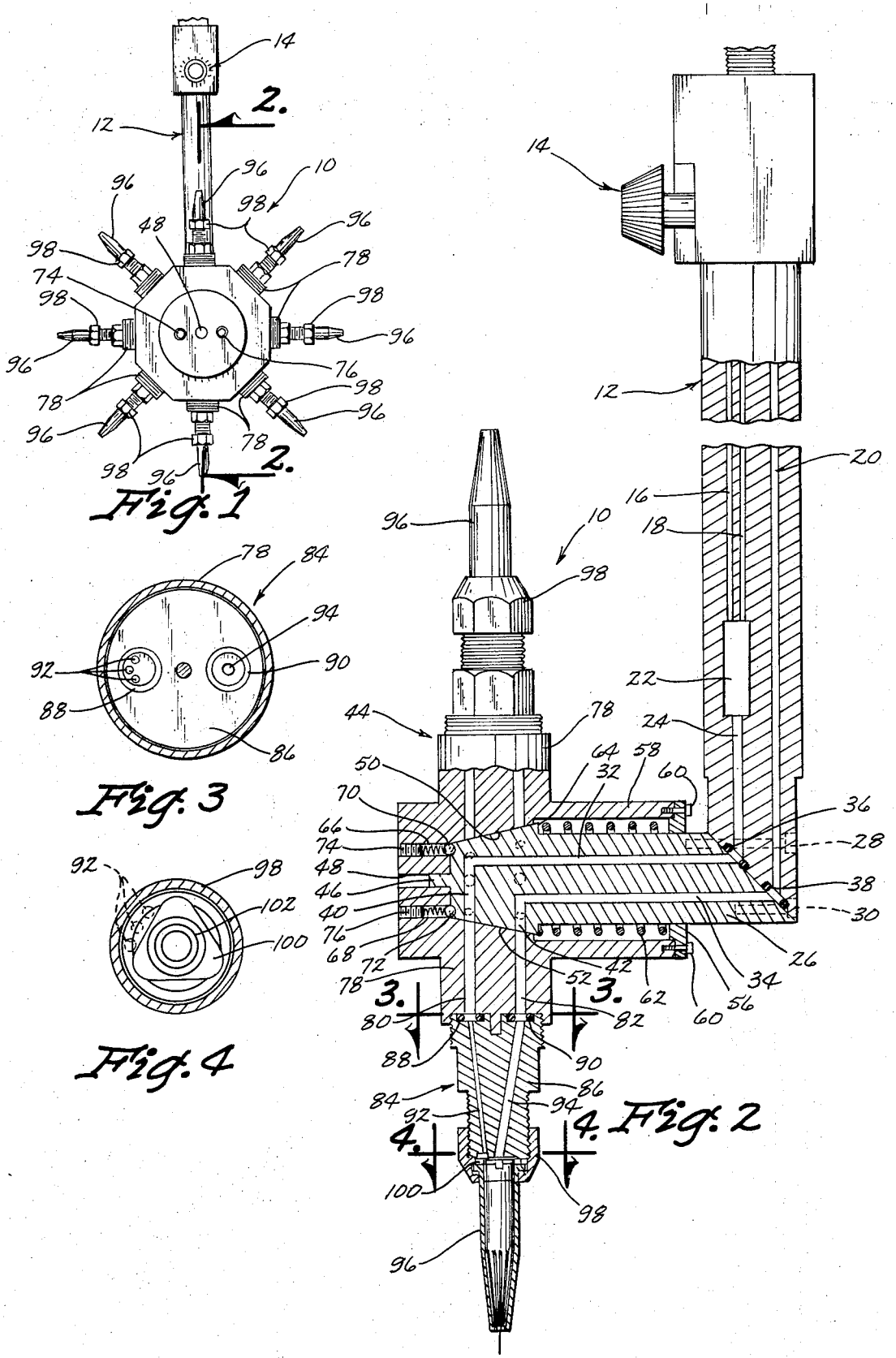

MACHINE MOUNTED CUTTING TORCH

Machine mounted cutting torches generally comprise a cutting torch having a single cutting tip thereon. The various types of materials being cut and the thicknesses thereof require that the cutting tip be replaced with the proper torch tip so that the cutting operation will be performed in the most efficient manner. If the tip is to be changed, it is necessary to threadably remove the tip mounted on the torch and threadably secure the proper tip on the torch. Obviously, such a procedure is time consuming and requires a certain amount of "down time" for the machine during the tip replacement process.

Therefore, it is a principal object of this invention to provide an improved machine mounted cutting torch.

A further object of this invention is to provide a machine mounted cutting torch having a cutting tip support means which is rotatable with respect to the material being cut so that the desired cutting tip can be placed in an operative position.

A further object of this invention is to provide a machine mounted cutting torch having a plurality of cutting tips mounted thereon.

A further object of this invention is to provide a machine mounted cutting torch having a tip turret mounted thereon.

A further object of this invention is to provide a machine mounted cutting torch including means for preventing the escape of the cutting gases.

A further object of this invention is to provide a machine mounted cutting torch which is efficient in operation.

A further object of this invention is to provide a machine mounted cutting torch which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front view of the torch of this invention:

FIG. 2 is an enlarged sectional view seen along lines 2—2 of FIG. 1:

FIG. 3 is an enlarged sectional view seen along lines 3—3 of FIG. 2; and

FIG. 4 is an enlarged sectional view seen along lines 4—4 of FIG. 2.

The numeral 10 generally refers to the cutting torch of this invention and generally comprises a support 12 which is operatively connected to a rotary mixing valve 14 of the type described in my co-pending application, Ser. No. 43,810 filed June 5, 1970 now U.S. Pat. No. 3,684,187 issued Aug. 15, 1972. The rotary mixing valve 14 is in communication with sources of industrial gas and oxygen to permit selective mixtures of the industrial gas and oxygen to flow through the conduits 16 and 18 extending through the support 12. The numeral 20 refers to an oxygen line or conduit which is in communication with a source of cutting oxygen. It should be understood that control means, such as disclosed in the co-pending application, is provided to permit the selective flow of oxygen, industrial gas and oxygen as required. A mixing chamber 22 is provided in the support 12 wherein the oxygen and industrial gas in the conduits 16 and 18 are mixed. Conduit 24 extends downwardly from the chamber 22 as viewed in FIG. 2.

A horizontal end portion 26 is secured to the lower end of the support 12 by cap screws 28 and 30. Conduits 32 and 34 extend through the end portion 26 and are in communication with the conduits 24 and 20. O-rings 36 and 38 are provided as viewed in FIG. 2 to prevent the escape of oxygen and gas at the connections of the conduits.

As seen in FIG. 2, the ends of conduits 32 and 34 terminate in vertical portions 40 and 42 respectively. The numeral 44 refers to a tip support turret which is rotatably mounted on the end portion 26. As seen in FIG. 2, the end of end portion 26 has an aligning pin 46 which is received in the opening 48 to properly align the turret 44 with respect to the end portion 26. Turret 44 has a cavity 50 formed therein which receives the tapered end portion 52 of end portion 26.

A retainer ring 56 embraces end portion 26 as seen in FIG. 2 and is secured to the collar portion 58 of the turret 44 by screws 60. Spring 62 is provided in the collar portion 58 and engages the shoulder 64 and the ring 56 to yieldably urge the turret 44 to the right as viewed in FIG. 2. The spring 62 maintains a positive engagement of the turrett 44 on the head portion 52. A pair of bores 66 and 68 extend inwardly through the turret 44. Detent balls 70 and 72 are provided in the bores 66 and 68 respectively and are yieldably urged into engagement with grooves formed in the outer end of the head portion 52. Screws 74 and 76 maintain the springs in the bores 66 and 68 respectively.

Turrett 44 has a plurality of spaced apart heads 78 provided thereon, each of which have bores 80 and 82 extending therethrough which are adapted to communicate with the bores 40 and 42 respectively. The numeral 84 refers to a tip-mixer assembly which is threadably secured to each of the heads 78. The mixer 86 is threadably secured to the head 78 and is provided with a pair of O-rings 88 and 90 provided therein which are positioned around the outer ends of the bores 80 and 82 to prevent the leakage of gas. A plurality of bores 92 are provided in the mixer 86 and have their upper ends in communication with the bore 80. A bore 94 extends through the mixer 86 and has its upper end in communication with the bore 82. A tip 96 is detachably secured to the lower end of the mixer 86 by nut 98. Tip 96 comprises an outer shell element 97 and an inner cone element 99. Tip 96 may be of one-piece construction if desired. The numeral 100 refers to a triangular shaped disc which is positioned the upper end of the tip 96 and the lower end of the mixer 86. O-ring 102 engages the upper surface of the disc 100 and surrounds the lower end of the bore 94.

The normal method of operation is as follows. The material to be cut is ordinarily placed below the apparatus 10 in the desired position. Depending on the particular type of material being cut and the thickness thereof, the turret 44 will be selectively rotated with respect to the end portion 26 until the proper tip 96 is positioned over the material to be cut. The proper tip is maintained in position by the detents as previously described. The valve 14 would be rotated to select the proper oxygen and industrial gas ratio. The valves controlling the flow of oxygen, industrial gas and the oxygen bypass line would be operated as desired. The gas and oxygen is supplied to the tip in the "down" position through the bores as previously described. When it is desired to employ a different tip, the supply of oxygen and gas would be discontinued and the turret 44 rotated until the desired tip was in the operative position. Thus it can be seen that an extremely novel machine mounted cutting torch has been provided which eliminates the necessity of removing one cutting tip and replacing it with another cutting tip each time a different type of cutting job is to be performed. Applicant's turret may be simply rotated until the proper tip is in position thereby resulting in much less "down" time for the machine. Any number of different tips may be employed on the turret thereby giving the machine mounted cutting torch great versatility. The design of the turret and its relationship with respect to the support means insures that the turret will be mounted thereon in a stable manner without fear of gas leakage. Thus it can be seen that the torch accomplishes at least all of its stated objectives.

I claim:

1. A machine mounted cutting torch comprising,
   a first support means positioned above the material being cut,
   a second support means comprising a tip support turret having spaced apart heads, said turret being rotatable about a horizontal axis with respect to said first support means,
   said turret heads having bores extending therethrough,
   said heads having a tip mixer assembly having a plurality of bores extending therethrough,
   said mixer assembly being threadably secured to said heads,
   the bore of said tip mixer assembly being maintained in sealed relationship with respect to the bore of said heads to prevent gas leakage.

2. The torch of claim 1 wherein means is provided for yieldably selectively maintaining said turret in various of its positions of rotation with respect to said first support means.

3. The torch of claim 2 wherein said means comprises a spring detent means.

4. The torch of claim 1 wherein first and second conduits extend through said first support means, said turret having a plurality of radially extending pairs of conduits which are selectively rotatable into communication with said first and second conduits, each of said cutting tips being in communication with one pair of conduits.

5. The torch of claim 1 wherein said one end has a tapered head portion thereon, said second support means comprising a central portion having a tapered cavity formed therein which rotatably receives said tapered head portion, means for maintaining said central portion on said head portion in a sealed relationship, said cutting tips being secured to said central portion and extending radially outwardly therefrom, said first support means having a conduit means extending therethrough, said central portion having a plurality of conduits formed therein in communication with said cavity, said tips being in communication with said conduits in said central portion.

* * * * *